(12) United States Patent
Abbas-Abadi et al.

(10) Patent No.: US 9,035,000 B2
(45) Date of Patent: May 19, 2015

(54) POLYOLEFIN PRODUCTION USING AN IMPROVED CATALYST SYSTEM

(76) Inventors: Mehrdad Seifali Abbas-Abadi, Tehran (IR); Mehdi Nekoomanesh Haghighi, Tehran (IR); Naeimeh Bahri-Laleh, Tehran (IR); Zahra Akbari, Mahshahr (IR); Mohamad Reza Tavasoli, Mahshahr (IR); Seyed Heydar Mirjahanmardi, Mahshahr (IR)

( * ) Notice: Subject to any disclaimer, the term of this patent is extended or adjusted under 35 U.S.C. 154(b) by 47 days.

(21) Appl. No.: 13/038,125

(22) Filed: Mar. 1, 2011

(65) Prior Publication Data

US 2011/0152483 A1  Jun. 23, 2011

(51) Int. Cl.
| | | |
|---|---|---|
| C08F 4/44 | (2006.01) | |
| C08F 4/649 | (2006.01) | |
| C08F 4/654 | (2006.01) | |
| C08F 10/00 | (2006.01) | |
| C08F 2/14 | (2006.01) | |
| C08F 10/02 | (2006.01) | |
| C08F 110/02 | (2006.01) | |
| C08F 210/08 | (2006.01) | |
| C08F 210/14 | (2006.01) | |
| C08F 210/16 | (2006.01) | |

(52) U.S. Cl.
CPC . C08F 10/00 (2013.01); *C08F 2/14* (2013.01); C08F 4/6493 (2013.01); C08F 4/6548 (2013.01); *C08F 10/02* (2013.01); *C08F 110/02* (2013.01); *C08F 210/08* (2013.01); *C08F 210/14* (2013.01); *C08F 210/16* (2013.01); *C08F 2500/12* (2013.01); *C08F 2500/24* (2013.01)

(58) Field of Classification Search
USPC ...................................................... 526/124.2
See application file for complete search history.

(56) References Cited

U.S. PATENT DOCUMENTS

| | | | |
|---|---|---|---|
| 3,354,139 A | 11/1967 | Vandenberg | |
| 3,432,513 A | 3/1969 | Miller et al. | |
| 4,181,790 A | 1/1980 | Maahs et al. | |
| 4,329,253 A | 5/1982 | Goodall et al. | |
| 4,508,842 A | 4/1985 | Beran et al. | |
| 4,657,998 A | 4/1987 | Malpass | |
| 4,892,853 A | 1/1990 | Cann et al. | |
| 5,442,018 A | 8/1995 | Cann et al. | |
| 5,502,127 A | 3/1996 | Bai | |
| 5,510,433 A | 4/1996 | Baker et al. | |
| 5,534,472 A | 7/1996 | Winslow et al. | |
| 5,863,995 A | 1/1999 | Daire | |
| 5,990,251 A | 11/1999 | Gelus | |
| 6,534,613 B2 * | 3/2003 | Ford et al. | ...................... 526/352 |
| 6,646,073 B2 | 11/2003 | Farrer et al. | |
| 2007/0197753 A1 | 8/2007 | Jiang et al. | |
| 2008/0033127 A1 | 2/2008 | Jiang et al. | |
| 2008/0161516 A1 * | 7/2008 | Gundert et al. | ................ 526/154 |

FOREIGN PATENT DOCUMENTS

| EP | 0286001 | 10/1988 |
|---|---|---|
| EP | 1016676 | 7/2000 |

OTHER PUBLICATIONS

Dashti et al., "Kinetic and morphological study of a magnesium ethoxide-based Ziegler-Natta catalyst for propylene polymerization," Polym. Int. 58:40-45 (2009).*
Luo et al. "Studies on highly efficient promoters for titanium-based Ziegler-Natta catalyst for ethylene polymerization," Applied Catalysis A: General 203 (2000) 269-273.*
Bahri-Laleh et al., "Effect of Halocarbon Promoters on Polyethylene Properties Using $MgCl_2$ (Ethoxide Type)/$TiCl_4$/$AlEt_3$/$H_2$ Catalyst System," Mar. 29, 2010, Journal of Applied Polymer Science, vol. 117, pp. 1780-1786 (7 pages).

* cited by examiner

*Primary Examiner* — Ling Choi
*Assistant Examiner* — Catherine S Branch
(74) *Attorney, Agent, or Firm* — Barry Choobin; Patent 360 LLC

(57) ABSTRACT

Polyolefin production using an improved catalyst system and, in particular, a method for production of a polyolefin is disclosed. One or more monomers are contacted with a catalyst system. The catalyst system includes titanium tetrachloride as a catalyst precursor and magnesium ethylate as a support for the catalyst precursor. The catalyst system also includes a hydrocarbyl aluminum cocatalyst represented by the formula $R_3Al$, where R is an alkyl radical having 1 to 14 carbon atoms, and where the molar ratio of the hydrocarbyl aluminum cocatalyst to the titanium tetrachloride catalyst precursor ranges from 50:1 to 400:1. The catalyst system also includes a halogenated hydrocarbon as a promoter, where the molar ratio of the halogenated hydrocarbon promoter to the titanium tetrachloride catalyst precursor ranges from 0.001:1 to 300:1.

13 Claims, 1 Drawing Sheet

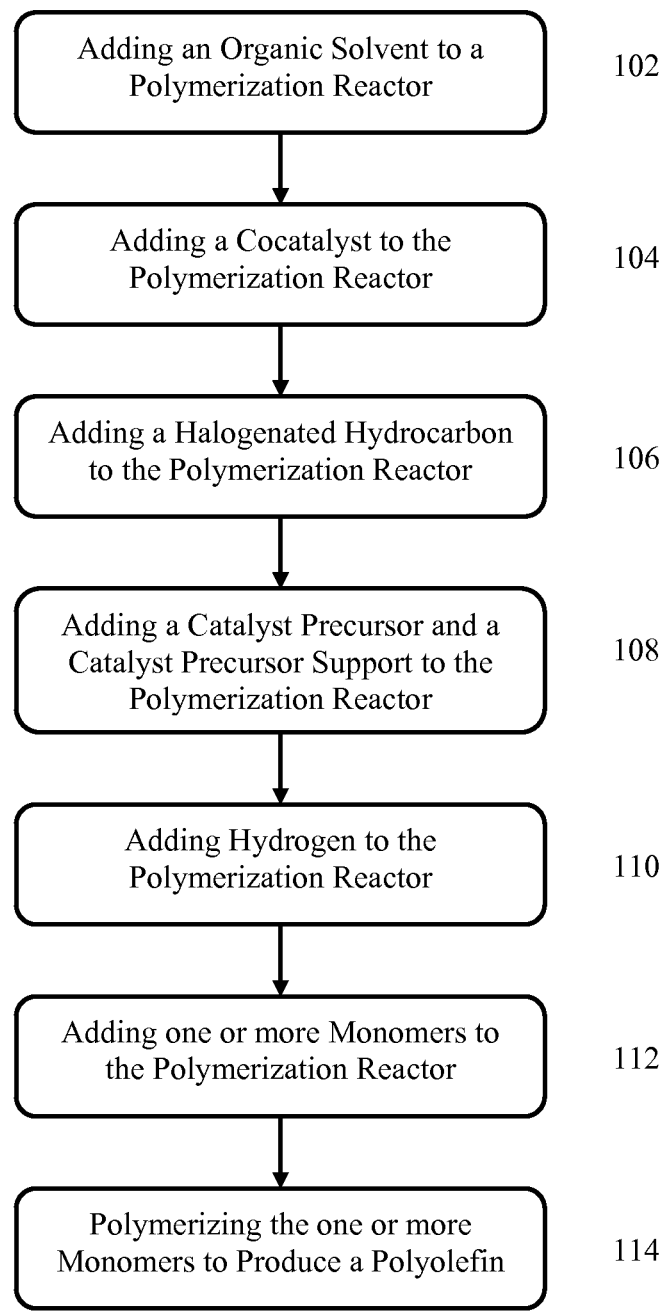

POLYOLEFIN PRODUCTION USING AN IMPROVED CATALYST SYSTEM

TECHNICAL FIELD

This application generally relates to polyolefin production, and more particularly relates to polyethylene production using an improved catalyst system.

BACKGROUND

Ziegler-Natta catalysts have been used in the production of over tens of millions of tons of polyolefin per year. Recent research has focused on the catalytic activity, polymer morphology, particle size distribution, hydrogen responsibility, and copolymerization performance of Ziegler-Natta catalyst systems. In particular, for slurry phase polymerization of ethylene, high catalyst activity and the control of the morphology of the resultant polyethylene are quite important.

However, one of the disadvantages associated with the use of Ziegler-Natta catalysts is that the yield of polyethylene per unit amount of the catalyst is relatively low. Therefore, a need exists for polyethylene production using a new catalyst system with a higher polymerization yield per unit amount of catalyst and improved polyethylene properties.

SUMMARY

Polyolefin production using an improved catalyst system and, in particular, a method for production of a polyolefin is disclosed. One or more monomers are contacted with a catalyst system. The catalyst system includes titanium tetrachloride as a catalyst precursor and magnesium ethylate as a support for the catalyst precursor. The catalyst system also includes a hydrocarbyl aluminum cocatalyst represented by the formula $R_3Al$, where R is an alkyl radical having 1 to 14 carbon atoms, and where the molar ratio of the hydrocarbyl aluminum cocatalyst to the titanium tetrachloride catalyst precursor ranges from 50:1 to 400:1. The catalyst system also includes a halogenated hydrocarbon as a promoter, where the molar ratio of the halogenated hydrocarbon promoter to the titanium tetrachloride catalyst precursor ranges from 0.001:1 to 300:1.

In some embodiments, the polyolefin can be polyethylene, the one or more monomers can include ethylene and 1-butene or 1-hexane, and the hydrocarbyl aluminum cocatalyst can be triethylaluminium. In addition, heptane or hexane diluent and/or hydrogen can be contacted with the catalyst system, along with the one or more monomers.

In some embodiments, the one or more monomers can be contacted with the catalyst system in a polymerization reactor at a temperature of 83° C. and at a pressure of 8.5 bar. The method for production of the polyolefin can be a slurry phase process for the copolymerization of the polyolefin.

In some embodiments, the magnesium ethylate support for the titanium tetrachloride catalyst precursor can be in powder or gel form. The titanium tetrachloride catalyst precursor and the magnesium ethylate support for the titanium tetrachloride catalyst precursor together can form a Ziegler-Natta catalyst precursor.

In some embodiments, the halogenated hydrocarbon promoter can be a chlorine-substituted alicyclic hydrocarbon having 1 to 6 carbon atoms. The halogenated hydrocarbon promoter can be chlorocyclohexane, tert-butyl chloride, 1,4-dichlorobutane, chloroform, chlorocyclopentane, chloroethane, chloromethane, chloropropane, chlorobenzene, and/or trichlorobenzene.

If the halogenated hydrocarbon promoter is chlorocyclohexane, the molar ratio of chlorocyclohexane to the titanium tetrachloride catalyst precursor can range from 50:1 to 200:1. If the halogenated hydrocarbon promoter is tert-butyl chloride, the molar ratio of tert-butyl chloride to the titanium tetrachloride catalyst precursor can range from 5:1 to 50:1. If the halogenated hydrocarbon promoter is 1,4-dichlorobutane, the molar ratio of 1,4-dichlorobutane to the titanium tetrachloride catalyst precursor can range from 0.1:1 to 5:1. If the halogenated hydrocarbon promoter is chloroform, the molar ratio of chloroform to the titanium tetrachloride catalyst precursor can range from 0.001:1 to 0.1:1.

A method for production of polyethylene is also disclosed. Ethylene and one or more alpha-olefins are contacted with a catalyst system. The catalyst system includes titanium tetrachloride as a catalyst precursor and magnesium ethylate as a support for the catalyst precursor. The catalyst system also includes a triethylaluminium cocatalyst, where the molar ratio of the triethylaluminium cocatalyst to the titanium tetrachloride catalyst precursor ranges from 50:1 to 400:1. The catalyst system also includes a chlorocyclohexane as a promoter, where the molar ratio of chlorocyclohexane promoter to the titanium tetrachloride catalyst precursor is 80:1.

Details of one or more implementations and/or embodiments of polyolefin production using an improved catalyst system are set forth in the accompanying drawings and the description below. Other aspects that can be implemented will be apparent from the description and drawings, and from the claims.

BRIEF DESCRIPTION OF DRAWINGS

FIG. 1 illustrates an example of a method for polyolefin production using an improved catalyst system.

Like reference symbols indicate like elements throughout the specification and drawings.

DETAILED DESCRIPTION

Polyolefin, such as, for example, polyethylene, production using an improved catalyst system is disclosed. The polyolefin production can be a slurry phase process for copolymerization of, for example, ethylene and one or more alpha-olefins. The catalyst system can include titanium tetrachloride ($TiCl_4$) as a catalyst precursor, magnesium ethylate ($Mg(OC_2H_5)_2$) as a support for the catalyst precursor, a hydrocarbyl aluminum cocatalyst, and a halogenated hydrocarbon as a promoter. The titanium tetrachloride catalyst precursor and the magnesium ethylate support for the titanium tetrachloride catalyst precursor can together form a Ziegler-Natta catalyst precursor in independent or pre-polymer form. The catalyst system has high catalyst activity, as discussed in greater detail below.

Referring to FIG. 1, a method for polyolefin production using an improved catalyst system is illustrated. Initially, an organic solvent can be added to a polymerization reactor (step 102). The organic solvent can be, for example, heptane and/or hexane. In some embodiments, the organic solvent can be used to dilute the catalyst system. The polymerization reactor, or reaction zone, can be any reactor, such as, for example, a stainless steel reactor.

Next, a cocatalyst can be added to the polymerization reactor (step 104). The cocatalyst can be an organometallic compound, such as, for example, hydrocarbyl aluminum. The hydrocarbyl aluminum cocatalyst can be represented by the formula $R_3Al$, where R is an alkyl radical having 1 to 14 carbon atoms and, preferably, 2 to 8 carbon atoms. In some embodiments, the alkyl radical can be ethyl and, thus, the hydrocarbyl aluminum cocatalyst can be triethylaluminium (TEAL; Al(Et)$_3$; C$_{12}$H$_{30}$Al$_2$).

Next, a halogenated hydrocarbon (i.e., halocarbon) can be added to the polymerization reactor (step 106). The halogenated hydrocarbon can act as a promoter or reactivator of the catalyst system, thereby increasing the catalyst activity in the reactor and the polymerization yield. In addition, the halogenated hydrocarbon improves hydrogen responsibility and the resultant polyolefin has narrower comonomer distribution, better crystallinity, and a lower wax amount. As such, the resultant polyolefin can have improved properties with respect to extrusion and injection molding.

The halogenated hydrocarbon can be, for example, a monohalogen or polyhalogen-substituted saturated aliphatic, alicyclic, or aromatic hydrocarbon having 1 to 12 carbon atoms. In some embodiments, the halogenated hydrocarbon can be a chlorine-substituted alicyclic compound having 4 to 8 carbon atoms and having at least one halogen atom attached to a carbon atom.

In some embodiments, the halogenated hydrocarbon compounds can be one or more of, for example, chlorocyclohexane (C$_6$H$_{11}$Cl), tert-butyl chloride (C$_4$H$_9$Cl), 1,4-dichlorobutane (C$_4$H$_8$C$_{12}$), chloroform (CHCl$_3$), chlorocyclopentane (C$_5$H$_9$Cl), chloroethane (C$_2$H$_5$Cl), chloromethane (CH$_3$Cl), chloropropane (C$_2$H$_7$Cl), chlorobenzene (C$_6$H$_5$Cl), and trichlorobenzene (C$_6$H$_3$Cl$_3$).

In some embodiments, the halogenated hydrocarbon can be added to the polymerization reactor together with the cocatalyst, whereas in other embodiments, the halogenated hydrocarbon can be added to the polymerization reactor separately in two or more batches over the course of polymerization.

Next, a catalyst precursor and a catalyst precursor support are added to the polymerization reactor (step 108). The catalyst precursor and the catalyst precursor support together can be a Ziegler-Natta catalyst precursor. In some embodiments, the catalyst precursor can be, for example, titanium tetrachloride (TiCl$_4$). The catalyst precursor can be added to the polymerization reactor directly or in the form of a prepolymer produced by means of preliminary polymerization of one or more olefins in the presence of the catalyst precursor.

In some embodiments, the catalyst precursor support can be, for example, magnesium ethylate (magnesium ethoxide; Mg(OEt)$_2$; Mg(OC$_2$H$_5$)$_2$). The catalyst precursor support can be in the form of a commercial powder, a milled powder, and/or a gel.

The catalyst precursor and catalyst precursor support can be synthesized by, for example, dispersing 114.3 grams of magnesium ethylate, under a blanket of N$_2$, in 1.5 liters of a diesel oil fraction in a flask. Next, 332 grams of titanium tetrachloride can be added dropwise to this dispersion over the course of 2 hours at 90° C. The reaction product is then washed with the diesel oil fraction until the supernatant solution no longer contains titanium and is then dried.

In some embodiments, the catalyst precursor, catalyst precursor support, halogenated hydrocarbon, and cocatalyst can be added to the polymerization reactor together, whereas in other embodiments, the catalyst precursor and catalyst precursor support, halogenated hydrocarbon, and cocatalyst can be added to the polymerization reactor separately in three or more batches over the course of polymerization.

Next, hydrogen can be added to the polymerization reactor (step 110). Hydrogen can be added to act as a chain growth limiter of the polyolefin.

Next, one or more monomers can be added to the polymerization reactor (step 112). Adding the one or more monomers to the polymerization reactor can include contacting the one or more monomers with the catalyst system. The one or more monomers can include, for example, ethylene (C$_2$H$_4$) and/or one or more alpha-olefins. The one or more alpha-olefins can be 1-butene (GPO, 1-hexene (C$_6$H$_{14}$), and/or 1-octene (C$_8$H$_{16}$). In some embodiments, in addition to the one or more monomers, high-density linear polyethylene can also be added to the polymerization reactor in step 110.

Finally, the one or more monomers can be polymerized to produce a polyolefin, such as, for example, polyethylene (step 114). The polymerization can be a homopolymerization or a copolymerization. In some embodiments, the polymerization in the presence of the catalyst system can be performed continuously or discontinuously in a slurry phase. In other embodiments, the polymerization can be performed in a gaseous state (i.e., in the absence of any liquid medium) or in the presence of a liquid dispersion medium in which the one or more monomers are soluble. The dispersing medium can be, for example, inert hydrocarbon or the monomers themselves.

In order to increase the polymerization yield of the polyolefin, the molar ratio of the cocatalyst added in step 104, the halogenated hydrocarbon added in step 106, and catalyst precursor added in step 108 should be optimized. For example, the molar ratio of the cocatalyst added in step 104 to the titanium tetrachloride catalyst precursor added in step 108 can range from 50:1 to 400:1 and, preferably, can range from 100:1 to 250:1. Similarly, the molar ratio of the halogenated hydrocarbon added in step 106 to the titanium tetrachloride catalyst precursor added in step 108 can range from 0.001:1 to 300:1 and, preferably, can range from 0.01:1 to 150:1.

In particular, the optimal molar ratio of halogenated hydrocarbon depends on the number of halogen atoms in the specific halogenated hydrocarbon, the number of carbon atoms in the specific halogenated hydrocarbon, and the form of the specific halogenated hydrocarbon. For example, the higher the number of halogen atoms in the specific halogenated hydrocarbon, the lower the molar ratio of halogenated hydrocarbon to the titanium tetrachloride catalyst precursor. The higher the number of carbon atoms in the specific halogenated hydrocarbon, the higher the molar ratio of halogenated hydrocarbon to the titanium tetrachloride catalyst precursor. Finally, relative to aliphatic hydrocarbons, aromatic and alicyclic hydrocarbons require a higher molar ratio of halogenated hydrocarbon to the titanium tetrachloride catalyst precursor.

In some embodiments, if the halogenated hydrocarbon is chlorocyclohexane, the molar ratio of the chlorocyclohexane to the titanium tetrachloride catalyst precursor can range from 50:1 to 200:1. If the halogenated hydrocarbon is tert-butyl chloride, the molar ratio of the tert-butyl chloride to the titanium tetrachloride catalyst precursor can range from 5:1 to 50:1. If the halogenated hydrocarbon is 1,4-dichlorobutane, the molar ratio of the 1,4-dichlorobutane to the titanium tetrachloride catalyst precursor can range from 0.1:1 to 5:1. If the halogenated hydrocarbon is chloroform, the molar ratio of the chloroform to the titanium tetrachloride catalyst precursor can range from 0.001:1 to 0.1:1.

In the following examples, polyethylene production using the catalyst system of the present application was carried out under slurry conditions in a stainless steel polymerization reactor equipped with a mechanical stirrer at a constant pressure of 8.5 bar and constant temperature of 83° C. The polymerization temperature was controlled by the circulation of water using a circulator. The polymerization was conducted in a semi-batch mode with a continuous ethylene monomer feed.

Before each polymerization experiment, the reactor was purged with nitrogen gas at 94° C. for about 1.5 hours to ensure the absence of moisture and oxygen. After cooling the reactor to 83° C., 500 milliliters of dry heptane was added to the reactor. Next, while stirring, triethylaluminium and titanium tetrachloride/magnesium ethylate catalyst precursor were added to the reactor at a 200:1 molar ratio of the aluminum to titanium, along with a specified halogenated hydrocarbon in an atmosphere of purified nitrogen. The reactor was pressurized with various pressures of hydrogen and ethylene was fed to maintain a reactor pressure of 8.5 bar. The stirrer speed was 500 rotations per minute ("RPM") to improve heat transfer. The residence time was kept constant at 1 hour and, following polymerization, the reactor was discharged and the powder polyolefin was dried in air.

In examples 1 to 12, the halogenated hydrocarbon in the catalyst system was chlorocyclohexane ("CHC"), no hydrogen was introduced to the system, and the form of the titanium tetrachloride/magnesium ethylate catalyst and the molar ratio of chlorocyclohexane to the titanium tetrachloride/magnesium ethylate catalyst were varied. Catalyst A represents titanium tetrachloride/magnesium ethylate in commercial powder form, catalyst B represents titanium tetrachloride/magnesium ethylate in milled powder form, and catalyst C represents titanium tetrachloride/magnesium ethylate in gel form. The catalyst activity was measured in kilograms of polyethylene produced per gram of titanium tetrachloride/magnesium ethylate catalyst used per hour of reaction (kg PE/g Cat/hr). The catalytic activity of examples 1 to 12 is show in TABLE 1 below.

TABLE 1

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Catalyst | A | A | A | A | B | B | B | B | C | C | C | C |
| CHC/Ti molar ratio | 0:1 | 80:1 | 120:1 | 160:1 | 0:1 | 80:1 | 120:1 | 160:1 | 0:1 | 80:1 | 120:1 | 160:1 |
| Catalyst Activity (kg PE/g Cat/hr) | 22 | 32 | 39 | 29 | 30 | 48 | 56 | 45 | 45 | 89 | 68 | 54 |

As shown in TABLE 1, the catalyst activity always increased in the presence of the halogenated hydrocarbon, chlorocyclohexane. In particular, the catalyst activity for catalyst C was increased by 97% in the presence of chlorocyclohexane. The optimal molar ratio of chlorocyclohexane to the titanium tetrachloride/magnesium ethylate catalyst was 120:1 for catalysts A and B, and 80:1 for catalyst C. Finally, the gel form of the titanium tetrachloride/magnesium ethylate catalyst, catalyst C, yielded the highest catalyst activity relative to the commercial powder (catalyst A) and milled powder (catalyst B) forms.

In examples 13 to 28, the halogenated hydrocarbon in the catalyst system was again chlorocyclohexane ("CHC"). The hydrogen pressure was varied between, 0, 3, 5, and 6.5 bar, the form of the titanium tetrachloride/magnesium ethylate catalyst was varied as described above in connection with examples 1 to 12, and the molar ratio of chlorocyclohexane to the titanium tetrachloride/magnesium ethylate catalyst was also varied.

The catalytic activity was measured by kilograms of polyethylene produced per gram of titanium tetrachloride/magnesium ethylate catalyst used per hour of reaction (kg PE/g Cat/hr). The melt flow index ("MFI") of polyethylene was measured at 230° C. under a load of 2.16 kilograms in accordance with the ASTM D-1238 standard and is expressed in grams of polyethylene per 10 minutes. The average particle size ("APS") of the polyethylene produced was measured in microns ("μm"). The wax percentage was measured after the polyethylene had been kept in n-heptane at its boiling point for 2 hours and is expressed in percentage by weight. The catalytic activity, melt flow index, average particle size, and wax percentage of examples 13 to 28 are shown in TABLE 2 below. "ND" stands for not detectable.

TABLE 2

| Example | Catalyst | $H_2$ Pressure (bar) | CHC/Ti molar ratio | Catalyst Activity (kg PE/g Cat/hr) | MFI (g PE/10 min) | APS (μm) | Wax Percentage (%) |
|---|---|---|---|---|---|---|---|
| 13 | A | 3 | 0 | 11.5 | 8.5 | 149 | 0.25 |
| 14 | A | 3 | 120 | 20.0 | 13.1 | 163 | 0.17 |
| 15 | A | 5 | 0 | 10.1 | 17.1 | 113 | 1.40 |
| 16 | A | 5 | 120 | 19.0 | 39.3 | 131 | 1.00 |
| 17 | B | 3 | 0 | 13.5 | 11.2 | 139 | 0.25 |
| 18 | B | 3 | 120 | 25.5 | 17.3 | 161 | 0.18 |
| 19 | B | 5 | 0 | 10.5 | 24.0 | 121 | 1.42 |
| 20 | B | 5 | 120 | 20.5 | 39.0 | 139 | 1.30 |
| 21 | C | 0 | 0 | 45.0 | ND | 298 | ND |
| 22 | C | 0 | 80 | 89.0 | ND | 308 | ND |
| 23 | C | 3 | 0 | 18.5 | 14.4 | 183 | 0.30 |
| 24 | C | 3 | 80 | 29.7 | 25.4 | 215 | 0.21 |
| 25 | C | 5 | 0 | 11.5 | 43.0 | 152 | 1.60 |
| 26 | C | 5 | 80 | 21.5 | 94.0 | 185 | 1.30 |
| 27 | C | 6.5 | 0 | 7.5 | 150.0 | 145 | 2.80 |
| 28 | C | 6.5 | 80 | 12.9 | 320.0 | 179 | 2.20 |

As shown in TABLE 2, as the pressure of hydrogen was increased, the catalyst activity decreased, the melt flow index increased, the average particle size decreased, and the wax percentage increased. When the halogenated hydrocarbon, chlorocyclohexane, was added to the catalyst system, the catalyst activity increased, the melt flow index increased, the average particle size increased, and the wax percentage decreased.

The commercial powder form of the titanium tetrachloride/magnesium ethylate catalyst yielded the smallest average particle size. The milled powder form of the titanium tetrachloride/magnesium ethylate catalyst yielded the lowest melt flow index, whereas the gel form yielded the highest melt flow index. The gel form of the titanium tetrachloride/magnesium ethylate catalyst yielded the largest particle size and lowest wax percentage.

In examples 29, 30, and 31, the halogenated hydrocarbon ("HC") in the catalyst system was changed from chlorocyclohexane to tent-butyl chloride ("BC"), 1,4-dichlorobutane ("DCB"), and chloroform ("C"), respectively. The hydrogen pressure was 5 bar, a gel form of the titanium tetrachloride/magnesium ethylate catalyst was used, and the molar ratio of the halogenated hydrocarbon to the titanium tetrachloride/magnesium ethylate catalyst was varied. The catalytic activity, melt flow index, average particle size, and wax percentage of examples 29, 30, and 31 are shown in TABLE 3 below. Example 26 of TABLE 2 is also included in TABLE 3 for comparison.

TABLE 3

| Example | HC | HC/Ti molar ratio | Catalyst Activity (kg PE/g Cat/hr) | MFI (g PE/ 10 min) | APS (μm) | Wax Percentage (%) |
|---|---|---|---|---|---|---|
| 26 | CHC | 80:1 | 21.5 | 94.0 | 185 | 1.30 |
| 29 | BC | 40:1 | 17.0 | 60.0 | 164 | 1.42 |
| 30 | DCB | 0.20:1 | 14.2 | 89.0 | 159 | 1.50 |
| 31 | C | 0.01:1 | 11.9 | 61.0 | 150 | 1.58 |

As shown in TABLE 3, the halogenated hydrocarbon of chlorocyclohexane produced polyethylene having the highest catalyst activity, highest melt flow index, largest average particle size, and lowest wax percentage.

The average particle size and wax content of polyethylene are important for processing centers. In particular, polyethylene having a sufficiently large particle diameter to minimize agglomeration and a low percentage of wax content greatly reduces fouling in processing. As such, by varying the various parameters of the catalyst system, such as the parameters discussed above in connection with examples 1 to 31, a polyethylene with optimal characteristics can be produced.

It is to be understood the implementations are not limited to the particular processes, devices, and/or apparatus described which may, of course, vary. For example, although FIG. 1 illustrates that an organic solvent is added to a polymerization reactor in step 102, that a cocatalyst is added to the polymerization reactor in step 104, that a halogenated hydrocarbon is added to the polymerization reactor in step 106, that a catalyst precursor and a catalyst precursor support is added to the polymerization reactor in step 108, that hydrogen is added to the polymerization reactor in step 110, that one or more monomers are added to the polymerization reactor in step 112, and that the one or more monomers are polymerized to produce a polyolefin in step 114, it is to be understood that many possible orderings of the steps can be used in the process of FIG. 1, depending on the particular polyolefin produced, the particular catalyst system, and/or user preference. Therefore, any order of steps 102-114 are within the scope of the present application.

It is also to be understood that the terminology used herein is for the purpose of describing particular embodiments only, and is not intended to be limiting. As used in this application, the singular forms "a," "an," and "the" include plural referents unless the content clearly indicates otherwise.

Reference in the specification to "one embodiment" or "an embodiment" means that a particular feature, structure, characteristic, or function described in connection with the embodiment is included in at least one embodiment herein. The appearances of the phrase "in some embodiments" in the specification do not necessarily all refer to the same embodiment.

Accordingly, other embodiments and/or implementations are within the scope of this application.

What is claimed is:

1. A method for production of a polyolefin, comprising:
   contacting one or more monomers with a catalyst system, wherein the catalyst system comprises:
   titanium tetrachloride ($TiCl_4$) as a catalyst precursor,
   magnesium ethylate ($Mg(OC_2H_5)_2$) as a support for the catalyst precursor,
   a hydrocarbyl aluminum cocatalyst represented by the formula $R_3Al$, wherein R is an alkyl radical having 1 to 14 carbon atoms, and the molar ratio of the hydrocarbyl aluminum cocatalyst to the titanium tetrachloride catalyst precursor ranges from 50:1 to 400:1, and
   1,4-dichlorobutane as a promoter, wherein the molar ratio of the 1,4-dichlorobutane promoter to the titanium tetrachloride catalyst precursor ranges from 0.1:1 to 5:1.

2. The method of claim 1, wherein the polyolefin is polyethylene.

3. The method of claim 1, wherein contacting the one or more monomers with the catalyst system comprises contacting ethylene ($C_2H_4$) and at least one other monomer with the catalyst system.

4. The method of claim 1, wherein the hydrocarbyl aluminum cocatalyst is triethylaluminium.

5. The method of claim 1, wherein contacting the one or more monomers with the catalyst system comprises contacting heptane or hexane diluent and the one or more monomers with the catalyst system.

6. The method of claim 1, wherein the method for production of the polyolefin is a slurry phase process for the copolymerization of the polyolefin.

7. The method of claim 1, wherein contacting the one or more monomers with the catalyst system comprises contacting the one or more monomers with the catalyst system in a polymerization reactor at a temperature of 83° C.

8. The method of claim 1, wherein contacting the one or more monomers with the catalyst system comprises contacting the one or more monomers with the catalyst system in a polymerization reactor at a pressure of 8.5 bar.

9. The method of claim 1, wherein contacting the one or more monomers with the catalyst system comprises contacting the one or more monomers with the catalyst system in the presence of hydrogen.

10. The method of claim 1, wherein the magnesium ethylate support for the titanium tetrachloride catalyst precursor is in powder form before contact of the one or more monomers with the catalyst system.

11. The method of claim 1, wherein the titanium tetrachloride catalyst precursor and the magnesium ethylate support for the titanium tetrachloride catalyst precursor together form a Ziegler-Natta catalyst precursor.

12. The method of claim 1, wherein the halogenated hydrocarbon promoter is a chlorine-substituted alicyclic hydrocarbon having 1 to 6 carbon atoms.

13. The method of claim 1, wherein the molar ratio of the hydrocarbyl aluminum cocatalyst to the titanium tetrachloride catalyst precursor ranges from 100:1 to 250:1.

* * * * *